Figure 1:
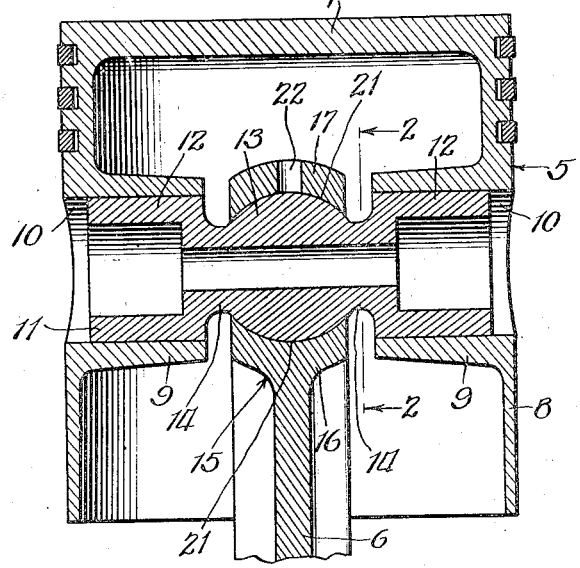

Sept. 4, 1923.

G. R. RICH 1,466,756

CONNECTING MEANS BETWEEN MOTOR PISTONS AND CONNECTING RODS

Filed Oct. 27, 1921

Inventor
George R. Rich
by Charles O. Survey
his Atty.

Patented Sept. 4, 1923.

1,466,756

UNITED STATES PATENT OFFICE.

GEORGE R. RICH, OF LOS ANGELES, CALIFORNIA.

CONNECTING MEANS BETWEEN MOTOR PISTONS AND CONNECTING RODS.

Application filed October 27, 1921. Serial No. 510,923.

*To all whom it may concern:*

Be it known that I, GEORGE R. RICH, a citizen of the United States, and a resident of Los Angeles, Los Angeles County, and State of California, have invented certain new and useful Improvements in Connecting Means Between Motor Pistons and Connecting Rods, of which the following is declared to be a full, clear, and exact description.

This invention relates to connecting means between motor pistons and their connecting rods, and its principal object is to provide a practically noiseless, tight joint between the piston and connecting rod, which joint is capable of adapting itself to any slight irregularities in alignment that are apt to occur in motor constructions or in assembling of parts thereof.

It is well known to those skilled in the art to which this invention pertains, that frequently the axes of the cylinders of internal combustion engines are not perpendicular to the axis of the crank shaft, and this is particularly so in motor constructions for automobiles, trucks, air plane motors or other motors employing a multiplicity of cylinders. Not only are the axes of the cylinders found to be deflected with respect to the crank shaft but the axes of the cylinders are often found to be out of their true parallel arrangement. Oft times in mounting the crank shaft in its bearings, its axis is thrown out of alignment, with the result that when the connecting rods are connected with the cranks and pistons, the rods must be bent, in order to align with the cranks and wrist pins, or the pistons are caused to tilt out of alignment, the piston rings are caused to bear unequally on the cylinder walls and excessive friction is developed, and loss of power is occasioned, because of imperfect bearing of the piston rings on the walls of the cylinder. Unnecessary wear takes place, and the parts soon become loose and noisy.

To overcome these objectionable features, I provide a joint between the piston and connecting rod, which, although tight and noiseless, permits of a limited amount of displacement or non-alignment of the crank shaft, and the connecting rod, without any binding of the parts, whereby the pistons may remain in alignment with the cylinders in which they are contained, and as a result, a more perfect contact may be had between the piston rings and cylinder walls and the tendency for the pistons to tilt or get out of alignment is thereby reduced to a minimum.

With these and other objects and advantages in view, this invention consists in a connecting means between the pistons and crank shaft, having a ball and socket joint, or its equivalent, for one end of the connecting rod. It further consists in a wrist pin connection between the piston and connecting rod having a ball and socket joint, or its equivalent, directly between the wrist pin and connecting rod. It further consists in the several novel features, hereinafter fully described and claimed.

Figure 2:
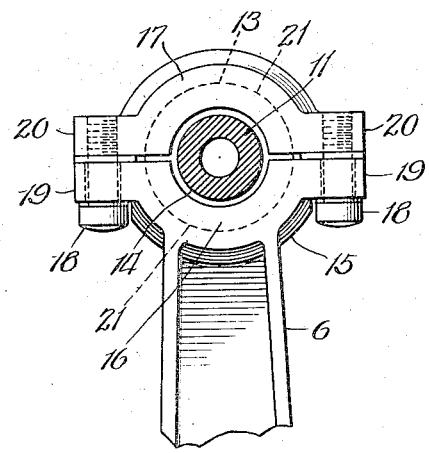
Figure 3:
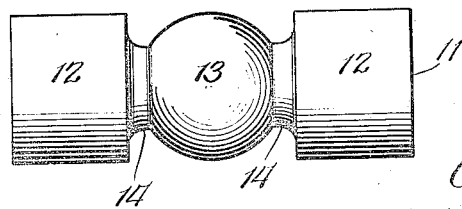

The invention is clearly illustrated in the accompanying drawing, in which:

Fig. 1 is a central, longitudinal section through a motor piston and a fragment of a connecting rod, and showing a simple embodiment of the present invention applied thereto; Fig. 2 is a detail, cross-section taken on line 2—2 of Fig. 1 and Fig. 3 is a side elevation of one form of the wrist pin used.

Referring to said drawing, which illustrates a simple embodiment of the invention, the reference character 5 designates a motor piston of usual and ordinary construction and 6 designates a fragment of its connecting rod. These parts are common and well known and require no especial description so far as this specification is concerned. Suffice to say, the piston is formed with a piston head 7 and a skirt portion 8 as usual, on the interior of which are formed co-axial oppositely disposed wrist pin bosses 9 having the bearing apertures 10 for the wrist pin.

The piston is connected to the connecting rod by a wrist pin 11 of novel construction, which affords a limited amount of angular movement of the connecting rod away from a line running at right angles to the axis of the wrist pin, without any unnecessary loose connection therebetween. Said wrist pin 11 is formed with cylindrical end portions 12 that fit in and are mounted in the apertures of the bosses 9 and, if desired, may be rotatively mounted therein and may be free to move lenghtwise of itself therein. Intermediate its ends, said wrist pin is provided with a ball like or spherical like portion 13, which, if desired may be made a part of, or separate from the body of the wrist pin. The ball like part 13 is here shown as formed integral with the body of the wrist pin; it is centrally located on the body of the pin and is connected to the end portions 13 by reduced or neck portions 14, as is clearly illustrated in Fig. 3. For the sake of lightness, the wrist pin may be made hollow, as shown in Figs. 1 and 2, although this is not essential.

The connecting rod is provided with a socket portion 15 upon its end, into which the ball portion 13 of the wrist pin is fitted. Said socket portion may be constructed in any suitable and desirable manner, and it is here shown as comprising two companion socket members 16, 17, the member 16 being formed integrally with the body of the connecting rod, and the member 17 being separate therefrom and secured thereto by bolts or screws 18 threadedly secured in ears 19, 20, formed respectively on the socket members 16, 17. Each socket member 16, 17, is formed with a substantially semi-spherical socket 21, which, when the parts are assembled, form a spherical bearing surface fitting the spherical surface of the ball part 13. An oil hole 22 may be provided for the admission of a lubricant to the bearing surface between the ball and its socket.

It will be perfectly apparent from the above description, that a close fit may be made between the wrist pin and the piston, and between the wrist pin and its connecting rod, irrespective of the condition of alignment of the crank shaft, its cranks, and the connecting rod, because of the play which is allowed between the wrist pin and the bosses and the play which is allowed on account of the ball and socket connection between the wrist pin and connecting rod. The latter may rock or swing on the ball joint in any direction, within given limits, whereby any bending of the parts at any place is eliminated. Friction is thereby reduced to a minimum, the piston is free to travel in co-axial alignment with the cylinder, the piston rings are free to seat more prefectly on the cylinder wall, and the efficiency of the motor is thereby increased to its maximum.

More or less variation of the exact details of construction is possible without departing from the spirit of this invention; I desire, therefore, not to limit myself to the exact form of the construction shown and described, but intend, in the following claims, to point out all of the invention disclosed herein.

I claim as new and desire to secure by Letters Patent:

1. A wrist pin for motor pistons, having cylindrical end bearing portions and a centrally disposed ball like portion whose diameter is not greater than that of the end bearing portions.

2. A wrist pin for motor pistons, having cylindrical end bearing portions and a centrally disposed ball like portion whose diameter is not greater than that of the end bearing portions and there being reduced neck like portions connecting the end portions with the ball like portion.

3. A wrist pin connecting between a motor piston and its connecting rod comprising a motor piston having wrist pin bearing apertures formed therein, and a wrist pin having cylindrical end bearing portions journaled in said bearing apertures, and a centrally disposed ball like portion, whose diameter is not greater than that of the bearing apertures in the piston, whereby the wrist pin may be inserted into the piston through said bearing apertures.

GEORGE R. RICH.